US011459950B2

(12) United States Patent
Porte et al.

(10) Patent No.: US 11,459,950 B2
(45) Date of Patent: Oct. 4, 2022

(54) SOUND ATTENUATION PANEL FOR AIRCRAFT HAVING A COMBINATION OF ACOUSTIC ATTENUATION PROPERTIES

(71) Applicant: AIRBUS OPERATIONS (S.A.S.), Toulouse (FR)

(72) Inventors: Alain Porte, Colomiers (FR); Jacques Lalane, Saint Orens de Gameville (FR); Arnulfo Carazo Mendez, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 632 days.

(21) Appl. No.: 16/379,205

(22) Filed: Apr. 9, 2019

(65) Prior Publication Data

US 2019/0309682 A1     Oct. 10, 2019

(30) Foreign Application Priority Data

Apr. 10, 2018  (FR) ...................................... 1853108

(51) Int. Cl.
*F02C 7/045*      (2006.01)
*B64D 33/02*      (2006.01)

(52) U.S. Cl.
CPC .............. *F02C 7/045* (2013.01); *B64D 33/02* (2013.01); *B64D 2033/0206* (2013.01); *F05D 2260/96* (2013.01)

(58) Field of Classification Search
CPC . F02C 7/045; B64D 33/02; B64D 2033/0206; F05D 2260/96

(Continued)

(56) References Cited

U.S. PATENT DOCUMENTS 4,298,090 A * 11/1981 Chapman .................. F02C 7/24
                                                          181/286
8,505,679 B2 * 8/2013 Porte ....................... F02C 7/045
                                                          181/214

(Continued)

FOREIGN PATENT DOCUMENTS

EP      2 070 816 A2      6/2009
FR      2 954 282 A1      6/2011

(Continued)

OTHER PUBLICATIONS

French Search Report for Application No. 1853108 dated Nov. 29, 2018.

(Continued)

*Primary Examiner* — Forrest M Phillips
(74) *Attorney, Agent, or Firm* — Jenkins, Wilson, Taylor & Hunt, PA

(57) ABSTRACT

Sound attenuation panel for aircraft having a combination of acoustic attenuation properties. The acoustic panel includes an acoustic structure having a cellular structure and a resistive skin and a backing skin, the acoustic panel also including at least one auxiliary acoustic device with cavities that is configured to produce additional acoustic absorption, the auxiliary acoustic device with cavities being attached to the acoustic structure and including adjacent chambers or cavities separated by shared walls, each of the chambers or cavities having perforations and being adapted to produce acoustic absorption. The combination of the acoustic structure and the auxiliary acoustic device with cavities enables combination of the acoustic absorption properties of these two types of element and an increased range of frequencies of the noise that can be attenuated by the acoustic panel without increasing its overall size.

17 Claims, 4 Drawing Sheets

(58) Field of Classification Search
USPC .......................................................... 181/292
See application file for complete search history.

(56) References Cited

U.S. PATENT DOCUMENTS

| | | | |
|---|---|---|---|
| 9,352,844 B2* | 5/2016 | Porte | B64D 33/02 |
| 9,620,102 B1* | 4/2017 | Ichihashi | B64D 33/02 |
| 9,732,677 B1* | 8/2017 | Chien | B64D 33/06 |
| 2010/0000227 A1* | 1/2010 | Porte | B64D 33/02 |
| | | | 60/796 |

FOREIGN PATENT DOCUMENTS

| | | |
|---|---|---|
| WO | WO 2008/006959 A1 | 1/2008 |
| WO | WO 2011/086273 A1 | 7/2011 |

OTHER PUBLICATIONS

European Office Action for Application No. 19167450.6 dated Feb. 17, 2021.

\* cited by examiner

SOUND ATTENUATION PANEL FOR AIRCRAFT HAVING A COMBINATION OF ACOUSTIC ATTENUATION PROPERTIES

CROSS-REFERENCE TO RELATED APPLICATION

This application claims priority to French Patent Application FR 1853108 filed Apr. 10, 2018, the entire disclosure of which is incorporated by reference herein.

TECHNICAL FIELD

The disclosure herein concerns an acoustic attenuation panel for aircraft and in particular for a cowl of a jet engine nacelle of an aircraft.

BACKGROUND

It is known that on an aircraft, for example on a transport aircraft, high levels of noise are often generated, in particular by the propulsion systems (or jet engines) of the aircraft. To reduce the effect of the sound produced by the jet engines of the aircraft it is known to provide, in particular at the level of the nacelles of the jet engines, walls provided with panels offering good acoustic absorption.

An acoustic attenuation panel, referred to as an acoustic panel hereinafter, usually and generally comprises an acoustic structure including a plate made from a material and/or a structure having good acoustic absorption properties, in particular for the frequencies of the most troublesome noise. This structure used for acoustic absorption may therefore be in a cellular material but also based on foam or fibrous material.

To this end, this plate often has a honeycomb cellular structure for most of the panels and is respectively provided on its two faces with a so-called resistive skin, often perforated, and a non-perforated backing skin. The acoustic panel is such that the resistive skin is situated in the vicinity of the noise source, in particular upstream and/or downstream of the fan in the case of an aircraft jet engine, to produce effective absorption of the noise generated upstream and downstream of the fan. The overall size (section and height) of the cells of the honeycomb structure is matched to the frequency of the noise to be absorbed.

A propulsive system of an aircraft more particularly includes an air intake that is provided with an acoustic panel of the above kind. This air intake has in particular to provide the acoustic treatment of the front part of the propulsion system and to absorb nuisance noise coming from the fan of the propulsion system. The acoustic panel primarily provides the acoustic treatment and a great part of the internal aerodynamics.

In the current configuration the front and rear parts of the acoustic panel do not have acoustic properties. In fact, their only function is to fix the acoustic panel. There is therefore a loss of acoustic absorption capacity in these front and rear parts. The construction principle of the acoustic panel rules out rendering the front and rear parts, which have a beveled shape, acoustically absorbent like the rest of the panel, for example by adding a cellular material.

An object of the disclosure herein is to improve the acoustic absorption properties of an acoustic panel, in particular of an air intake of a propulsion system, and in particular by increasing the acoustic area.

SUMMARY

The disclosure herein concerns an acoustic panel for aircraft, and in particular for a nacelle of a propulsion system (or jet engine) of the aircraft, the acoustic panel including an acoustic structure having an internal skin of controlled porosity termed the resistive skin, a cellular structure and a reflective so-called backing skin in the cellular zone.

According to the disclosure herein, the acoustic panel includes at least one auxiliary acoustic device with cavities that is configured to produce acoustic absorption preferably targeting low frequencies whilst retaining a backing skin at approximately the same height (i.e. between 0 and +30% greater than the height of the cells of the cellular structure) as in line with waveguide cellular structures, the auxiliary acoustic device with cavities being attached to the acoustic structure, the auxiliary acoustic device with cavities including a plurality of adjacent chambers (or cavities) separated by shared walls, each of the (axillary) chambers preferably having a significantly greater volume than a cell of the cellular structure (i.e. between 3 and 30 times the latter), and including perforations adapted to produce acoustic absorption.

Thus according to the disclosure herein at least one auxiliary acoustic device is added to the acoustic structure. The combination of the cellular acoustic structure and the auxiliary acoustic device with cavities enables combination of the acoustic absorption properties and frequencies of the two types of acoustic absorption and thus increased overall acoustic absorption of the acoustic panel, i.e. also to provide acoustic elements matched to sources of noise that is not absorbed by the cellular acoustic structure alone.

The acoustic panel and in particular the combination of the cellular acoustic structure and the auxiliary acoustic device may be produced in various ways.

To be more precise the acoustic panel therefore includes an acoustic structure including a cellular structure and a so-called resistive skin (or front skin) and a so-called backing skin on respective opposite sides of that cellular structure, the acoustic panel including at least one auxiliary acoustic device with cavities configured to produce acoustic absorption, the auxiliary acoustic device with cavities being fastened to the acoustic structure, the auxiliary acoustic device with cavities including a plurality of adjacent chambers separated by shared walls, each of the chambers including perforations and being adapted to produce acoustic absorption.

The auxiliary acoustic device with cavities is advantageously on a peripheral edge of the acoustic structure where the acoustic panel includes an end part for fixing the acoustic panel. Also, the perforations are provided on a front face of the auxiliary acoustic device with cavities, i.e. on the same side as the perforations in the resistive skin (front skin).

In a (preferred) first embodiment, the cellular acoustic structure and the auxiliary acoustic device with cavities form a one-piece part.

Moreover, and advantageously, in this first embodiment:
the auxiliary acoustic device with cavities has a first face that corresponds to the extension of the resistive skin, walls of at least some of the chambers forming part of the first face; and/or
the auxiliary acoustic device with cavities has a second face that corresponds to the extension of the backing skin, walls of at least some of the chambers forming part of the face.

Moreover, in a second embodiment, the auxiliary acoustic device is fixed to the acoustic structure.

Also, and advantageously, in this second embodiment:
the auxiliary acoustic device has a so-called front face, the front face having at least a first part with perforations and a second part with no perforations, and the resistive skin of the acoustic structure is fixed to the second part of the front face; and/or the auxiliary acoustic device has a so-called rear face that is fixed to the backing skin of the acoustic structure in an aligned or non-aligned manner.

Moreover, and advantageously, the at least one auxiliary acoustic device with cavities is at least on part of at least one peripheral edge of the acoustic structure.

Also, in one particular embodiment, the acoustic panel advantageously includes at least two auxiliary acoustic devices on at least two peripheral edges of the acoustic structure or on at least two sections of a peripheral edge of the acoustic structure.

Moreover, and advantageously, the auxiliary acoustic device has at least one so-called perforated face with the perforations and the perforated face is on the same side of the acoustic panel as the resistive skin.

In the context of the disclosure herein, the chambers of the auxiliary acoustic device may be produced in various ways. They advantageously include perforations (or microperforations) having small areas, of a size included in a circle with a diameter between 0.2 and 1 millimeter inclusive.

Moreover, in a first embodiment, the auxiliary acoustic device includes chambers of identical volume.

Also, in a second embodiment, the auxiliary acoustic device with cavities includes chambers (or cavities) of different types, in particular having different chamber volumes and/or (overall) areas of perforations per chamber that are different. Each type of cavity or chamber is configured to enable preferential acoustic absorption in at least one given range of acoustic frequencies.

For each chamber of the auxiliary acoustic device at least the volume of the chamber and the area of the perforations of the chamber are advantageously adapted to confer on the chamber preferential acoustic absorption in at least one given range of acoustic frequencies.

The disclosure herein also concerns a method of manufacturing an acoustic panel such as that described above.

According to the disclosure herein, the manufacturing method includes a plurality of successive steps including at least one curing step and configured to manufacture an acoustic panel having a cellular acoustic structure, a so-called resistive skin and a so-called backing skin and at least one auxiliary acoustic device (including large chambers or cavities).

In a preferred embodiment, the plurality of successive steps of the method of manufacture consists in or comprises at least:
  forming a one-piece assembly comprising the acoustic structure having the cellular structure and the resistive and backing skins and one or more auxiliary acoustic devices with cavities; and
  curing the one-piece assembly formed in this way to manufacture a one-piece part.

In another embodiment, the plurality of successive steps of the method of manufacture consists in or comprises at least:
  manufacturing the acoustic structure having the cellular structure and the resistive and backing skins;
  manufacturing one or more auxiliary acoustic devices, including curing; and
  fixing the auxiliary acoustic device or devices to the acoustic structure.

BRIEF DESCRIPTION OF THE DRAWINGS

The appended figures show clearly how the disclosure herein may be reduced to practice. In these example figures identical references designate similar elements. More particularly.

DETAILED DESCRIPTION

Figure 1:
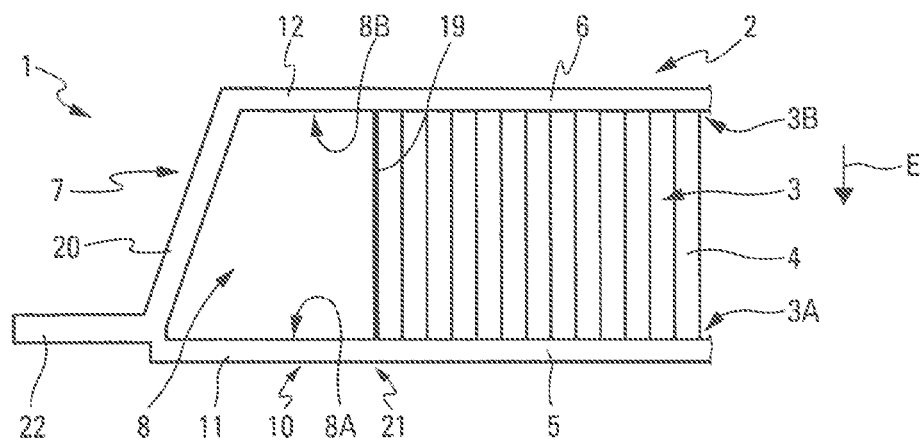
FIGS. 1 and 2 are diagrammatic views in section and in perspective of a first embodiment of an acoustic panel.
Figure 2:
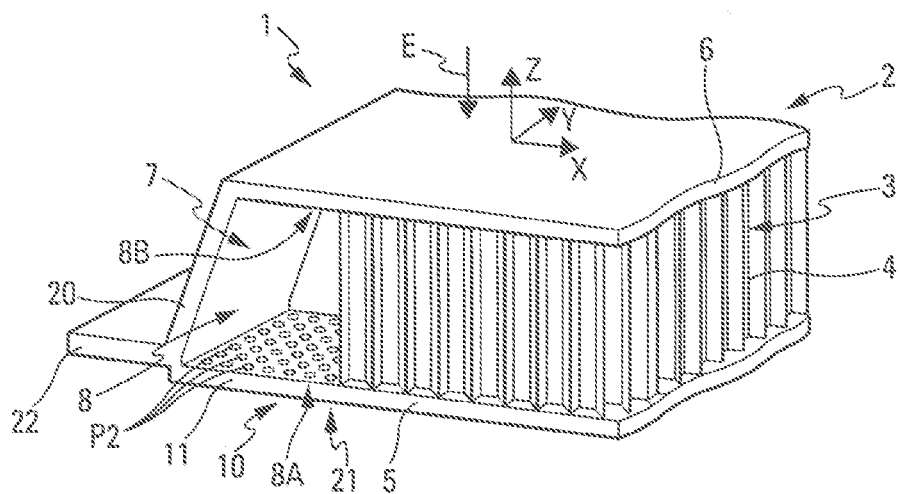
Figure 3:
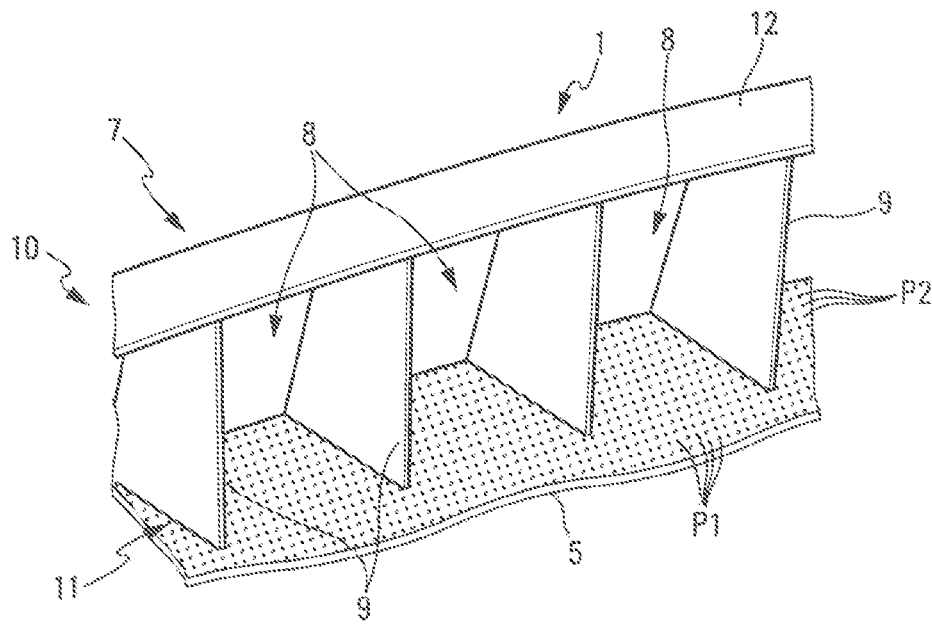
FIG. 3 is a partial perspective view of an auxiliary acoustic device of the first embodiment of the acoustic panel.

The acoustic panel 1 (or acoustic attenuation panel) represented diagrammatically in a (preferred) first embodiment in FIGS. 1 to 3 to enable illustration of the disclosure herein is intended to enable reduction (or attenuation) of noise by absorbing it on an aircraft (not shown), in particular on a transport aircraft.

In the usual manner, this acoustic panel 1 includes an acoustic structure 2 that is adapted to absorb noise in order to attenuate it and includes, as shown in FIGS. 1 and 2:
  a cellular structure 3 made from a material 4 specified hereinafter;
  a so-called resistive skin 5 (or front skin) that is permeable to air and porous, i.e. that for example includes a plurality of perforations (or holes, openings, apertures) P1 passing completely through the resistive skin 5, the perforations P1 being represented by dots P1 in FIG. 3 in particular; and
  a reflective so-called backing skin 6 in the cellular closing the acoustic panel 1. This backing skin 6 is not perforated, possibly with localized exceptions for draining water.

To be more precise, the resistive skin 5 is more permeable to air, and therefore to sound, at least to sounds to be attenuated by the acoustic panel 1, than the backing skin 6.

This resistive skin 5 and this backing skin 6 are arranged and fixed on respective opposite sides of the cellular structure 3, namely on a (front) face 3A of the cellular structure 3 for the resistive skin 5 and a (rear) face 3B of the plate 3 for the backing skin 6 (FIG. 1).

In FIG. 2 is shown a frame of reference XYZ with a direction (or axis) Z orthogonal to the cellular structure 3 (and substantially plane in the example from this FIG. 2) defined in a plane XY. Also, an arrow E indicates a direction defining a forward direction (directed along the axis Z and toward the source of noise to be treated) relative to the cellular structure 3. The direction opposite that of the arrow E defines a so-called rearward direction relative to the cellular structure 3. In the remainder of the description the adjectives forward and rearward are defined relative to the direction of the arrow E.

The acoustic panel 1 is generally disposed so that the resistive skin 5 is positioned in the vicinity of and preferably close to (or facing) the source of noise to be attenuated. The resistive skin 5 is arranged closer to the source of noise than the backing skin 6. Noise penetrates through the perforations P1, through the resistive skin 5, some of this energy is dissipated on being converted to heat, and then communicated to the interior of the cellular structure 3 and is then reflected by the backing skin 6, therefore finding itself in phase opposition with the incoming wave. The resistive skin 5 is produced so as to have sufficient mechanical strength according to the intended application, in particular to withstand the pressure of a flow of air, and the accelerations of the load factors in the case of an aircraft jet engine.

If the resistive skin 5 is aerodynamic, i.e. if it is in contact with the airflow, the surface of the resistive skin 5 is arranged in the boundary layer of the flow.

The resistive skin 5 may be produced in various ways. In particular it may be produced in the form of:
- a perforated or microperforated skin with holes with different (circular or oblong) shapes;
- a wire mesh or polymer grille that is very finely woven in order to be permeable to sound but to limit aerodynamic interactions and to reduced drag;
- a more or less complex assembly made up of mesh and reinforcements based on composite materials or metals.

The acoustic absorption is produced by the resistive skin 5. In some embodiments the material 4 of the cellular structure 3 is able to participate in acoustic absorption, as specified hereinafter.

The backing skin 6 may also be aerodynamic (in contact with the aerodynamic flow) depending on the configuration and the installation of the acoustic panel on the aircraft. It has in particular the function of providing the structural strength of the acoustic structure 2.

According to the disclosure herein, the acoustic panel 1 also includes at least one auxiliary acoustic device 7 with cavities configured to produce acoustic absorption. The auxiliary acoustic device 7 with cavities is attached to the acoustic structure 2 and includes a plurality of adjacent chambers (or cavities) 8 separated by shared walls (or partitions) 9, as shown in FIG. 3 in particular. Each of the (closed) chambers 8 includes perforations P2 and is adapted to produce acoustic absorption.

Accordingly, the acoustic panel 1 includes in addition to the acoustic structure 2 at least one such auxiliary acoustic device 7 with cavities. The combination of the acoustic structure 2 and the auxiliary acoustic device 7 with cavities enables combination of the acoustic absorption properties of the two types of acoustic absorption and thus increased overall acoustic absorption of the acoustic panel 1 and provision of acoustic attenuation chambers (or cavities) 8 suited to noises that are not absorbed by the cellular structure 3 alone, as specified hereinafter.

The acoustic panel 1 and in particular the combination of the acoustic structure 2 and the auxiliary acoustic device 7 with cavities may be produced in various ways.

Figure 4:
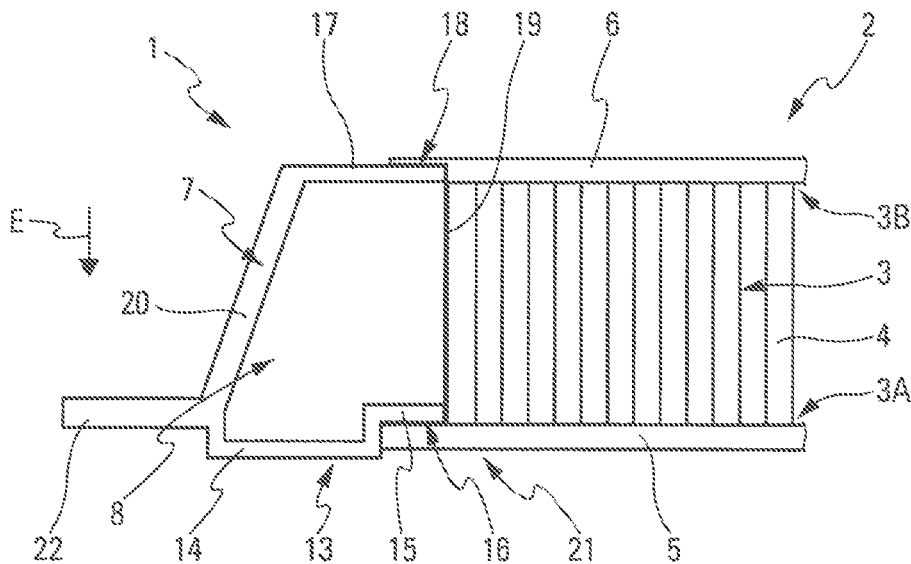
FIG. 4 is a diagrammatic sectional view of a second embodiment of an acoustic panel.

In the context of the disclosure herein the cavities or chambers 8 of the auxiliary acoustic device 7 with cavities may also be produced in various ways. The chambers 8 are closed, with the only openings to access the interior of the chamber 8 being the perforations (or microperforations) P2, as shown in FIGS. 2, 3 and 4. These perforations (or microperforations) P2 have small areas, in particular such that the shape (any shape) of the perforations P2 can be included in a circle having a diameter between 0.2 and 0.8 millimeter inclusive. Any type of arrangement and shape of these perforations P2 is possible. By way of illustration, the perforations may be distributed in lines and in columns on the surface of the wall concerned with distances of 0.1 to 3 millimeters separating two adjacent perforations P2.

In the (preferred) first embodiment shown in FIGS. 1 to 3 the acoustic structure 2 and the auxiliary acoustic device 7 with cavities form a one-piece part 10.

In this first embodiment, the auxiliary acoustic device 7 includes a so-called front face 11 that preferably corresponds to an extension of the resistive skin 5. The front walls 8A of the chambers 8 of the auxiliary acoustic device 7 with cavities form part of this front face 11. Depending on the embodiment, the distribution, shape, size and/or overall area of the perforations P2 on the face 11 may be identical to or different from the distribution, shape, size and/or overall area of the perforations P1 in the resistive skin 5.

Also, in the example of this first embodiment shown the auxiliary acoustic device 7 with cavities includes a so-called rear face 12 that preferably corresponds to an extension of the backing skin 6. The rear walls 8B of the chambers 8 form part of this rear face 12.

Figure 5:
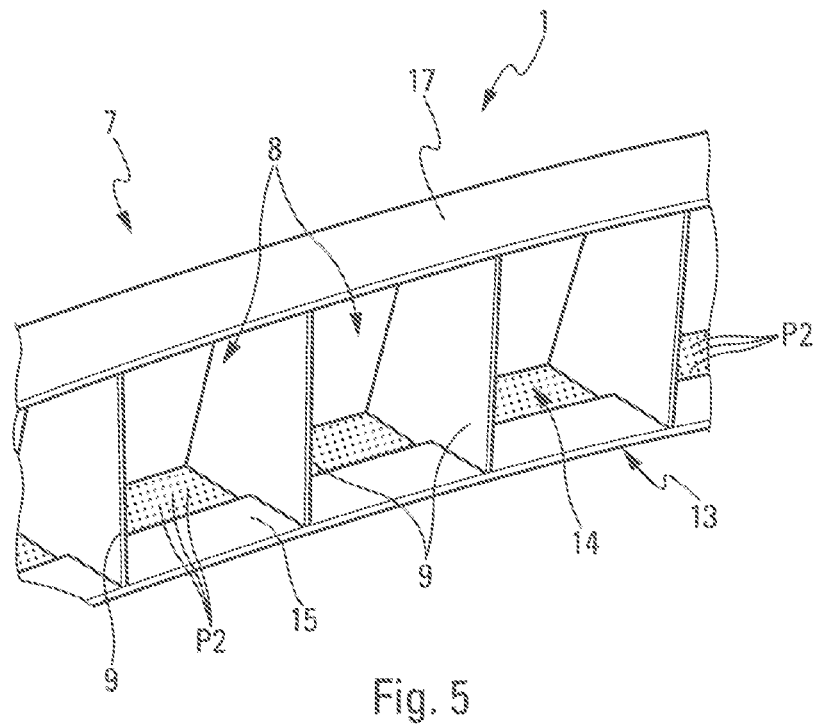
FIG. 5 is a partial perspective view of an auxiliary acoustic device of the second embodiment of the acoustic panel.

Moreover, in a second embodiment shown in FIGS. 4 and 5 the auxiliary acoustic device 7 with cavities is fixed to the acoustic structure 2.

In the example of this second embodiment shown the auxiliary acoustic device 7 with cavities includes a so-called front face 13 that includes at least a first part 15 with no perforations and a second part 14 with the perforations P2. The resistive skin 5 of the acoustic structure 2 is fixed to the second part 15 (with no perforations) of the front face 13 on a strip referenced 16 in FIG. 4.

Also, in the example of this second embodiment shown the auxiliary acoustic device 7 with cavities includes a so-called rear face 17 that is fixed to the backing skin 6 of the acoustic structure 8 on a strip referenced 18 in FIG. 4.

Different types of fixing may be envisioned for fixing the part 15 of the front face 13 to the resistive skin 5 and/or for fixing the rear face 17 to the backing skin 6. This fixing may be produced in particular by gluing or by draping.

Figure 6:
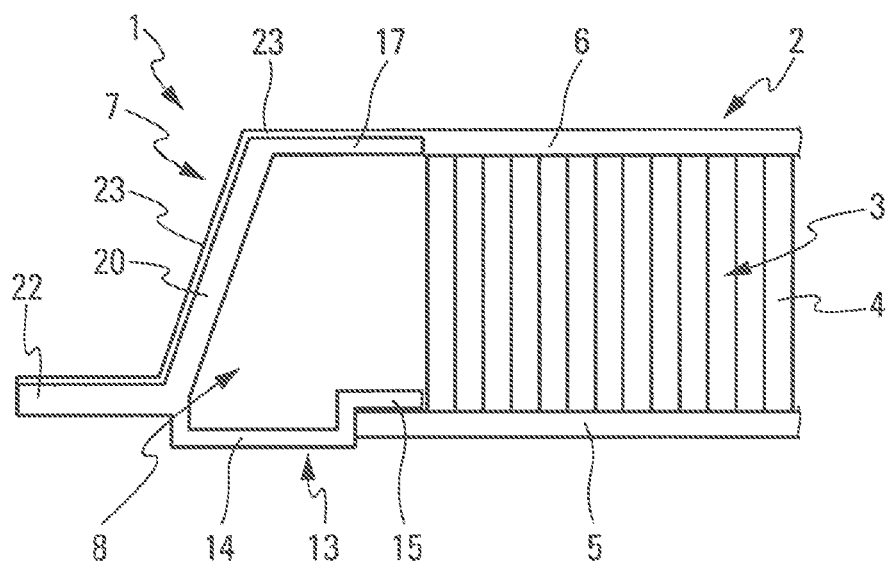
FIG. 6 is a diagrammatic sectional view of a variant of the second embodiment of the acoustic panel.

In the example from FIG. 6 (corresponding to a variant embodiment of the example from FIG. 4), complete draping illustrated by a skin 23 is effected starting from the backing skin 6 on the face 17 and the elements 20 and 22 specified hereinafter. The structural backing skin 6 may be draped partially or totally over the chambers.

The perforations P2 are preferably provided on a front face 11, 13 of the auxiliary acoustic device 7, i.e. on the same side (toward the front) as the perforations P1 in the resistive skin 5 (front skin). In a preferred embodiment the front face 11, 13 of the auxiliary acoustic device 7 and the resistive skin 5 are positioned in the vicinity of and preferably close to (or facing) the source of noise to be attenuated, which in particular enables increased efficacy of acoustic absorption.

In one particular embodiment the acoustic panel 1 includes at least one auxiliary skin 19 between the auxiliary acoustic device 7 and the acoustic structure 2, as shown in FIGS. 1 and 4. This auxiliary skin 19 represents a wall of chambers (or cavities) 8 of the auxiliary acoustic device 7. In the examples shown, each of the chambers 8 is therefore formed, both in the embodiment from FIG. 1 and in that from FIG. 4, of the partitions 9, a front wall (11 or 13), a backing wall (12 or 17), the auxiliary skin 19 and a wall 20.

In the context of the disclosure herein the auxiliary acoustic device 7 may be attached to the acoustic structure 2 in any zone of the acoustic structure 2. It is therefore possible to provide the auxiliary acoustic device 7 on a part or zone of the plane XY of one of the skins, the front skin 5 or the backing skin 6.

However, in a preferred (but non-exclusive) embodiment the auxiliary acoustic device 7 with cavities is on at least a part of at least one peripheral edge 21 of the acoustic structure 2, as shown in FIGS. 1, 2 and 4.

As the auxiliary acoustic device 7 is at a peripheral edge 21 of the acoustic structure 2, this arrangement, over and above increasing the absorption properties and capacities, has no or very little impact in terms of overall size and at most a low impact in terms of mass for the acoustic panel 1. In fact, at the peripheral edge 21, the acoustic panel generally includes an edge part for fixing the acoustic panel 1. As shown in FIGS. 1, 2 and 4 in particular, the auxiliary acoustic device 7 with cavities may include or not an end plate 22 for fixing the acoustic panel 1. This end plate 22 may be continuous with one of the skins 5 and 6.

Moreover, in a particular variant (not shown) of this first preferred embodiment, the acoustic panel 1 includes at least two auxiliary acoustic devices 7 on at least two respective peripheral edges of the acoustic structure 2 or on at least two respective sections of a peripheral edge of the acoustic structure 2.

Moreover, in a first embodiment, the auxiliary acoustic device 7 includes identical chambers 8, as shown in FIGS. 3 and 5 in particular.

Figure 7:
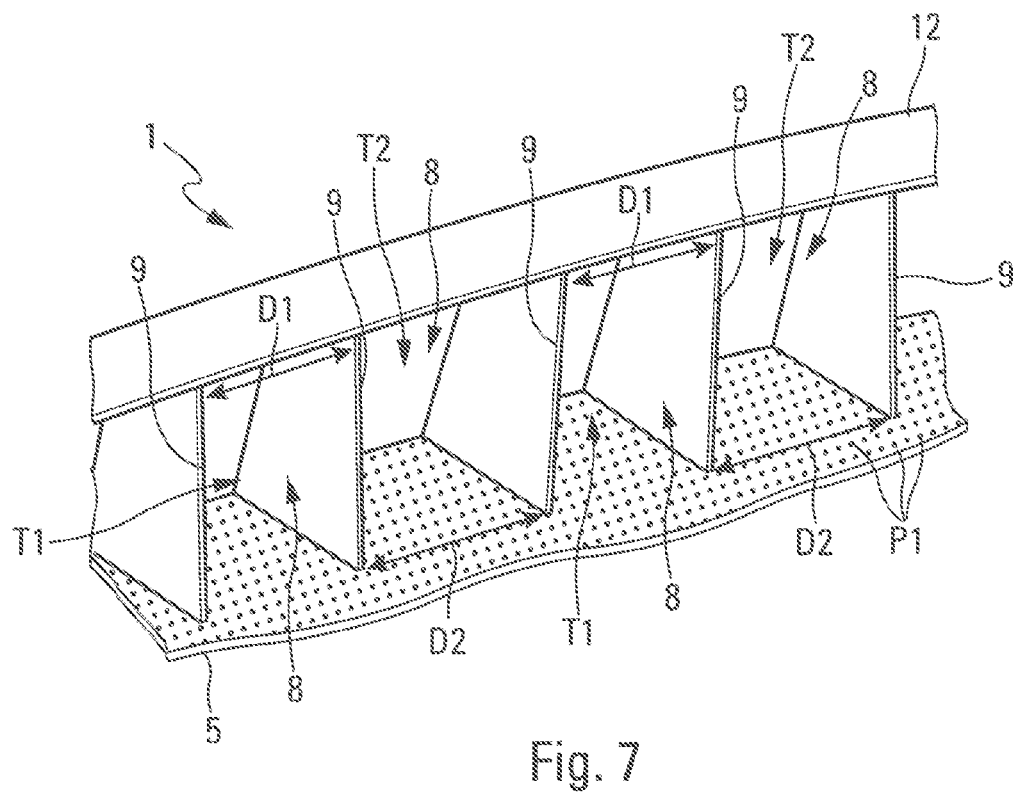
FIG. 7 is a view similar to that of FIG. 3 with chambers of different sizes.

Also, in a second embodiment, the auxiliary acoustic device 7 includes chambers 8 of a plurality of (two, three, four, . . . ) different types, as shown in FIG. 7.

Each type T chamber 8 is preferably configured to enable preferential acoustic absorption in at least one given range of acoustic frequencies. Consequently, for two different types T1 and T2, as in the example from FIG. 7, the type T1 chambers 8 produce preferential acoustic absorption in a given range of acoustic frequencies different form that in which the acoustic absorption of the type T2 chambers 8 is produced.

By "preferential acoustic absorption" in the range of acoustic frequencies concerned is meant that a chamber 8 has acoustic properties enabling it to absorb effectively noises at frequencies forming part of the range of acoustic frequencies concerned, whether or not it is in a position to absorb noises having frequencies outside the range.

To this end, for each chamber 8 of the auxiliary acoustic device 7 at least the volume of the chamber 8 and the overall area of all the perforations P2 in the chamber 8 are adapted in order to confer preferential acoustic absorption on the chamber 8 in the range of acoustic frequencies concerned.

In the example from FIG. 7 the different types are produced by different chamber volumes. These different volumes are simply obtained by different spacings of the successive walls 9 in the direction Y (FIG. 2) with a spacing distance D1 for the type T1 chambers 8 and a spacing distance D2 (greater than the spacing distance D1) for the type T2 chambers 8. The rest of the characteristics of these chambers 8 are identical.

In a first variant embodiment, the chambers 8 of different types may be mixed, in particular distributed relatively uniformly in the auxiliary acoustic device 7. This distribution may for example be an alternating distribution, i.e. in the case of two different chamber types T1 and T2 along a section (in the direction Y) of the auxiliary acoustic device 7 there are alternately provided a chamber 8 of type T1, then a chamber 8 of type T2, then a chamber 8 of type T1, and so on, as shown in the example from FIG. 7.

In this first variant embodiment all the parts of the auxiliary acoustic device 7 with cavities are configured to absorb the same plurality of ranges of acoustic frequencies.

Moreover, in a second variant embodiment (not shown), the chambers (or cavities) 8 of the same type, from among the different types, may be either grouped in at least one zone or one given section of the auxiliary acoustic device 7 or contribute to different spacings of walls 9, thereby creating different volumes for damping different noise sources.

Thus different zones of the acoustic panel 1 may be provided each of which is appropriate to the absorption of noises at particular frequencies. This second variant embodiment is in particular advantageous in the presence of different noise sources having different frequencies and localized at different places.

The acoustic panel 1 is then configured and disposed so that each of these zones is situated as close as possible to the source of noise that it must attenuate.

The acoustic absorption device 7 therefore enables absorption of noise at different frequencies, and in particular at higher or lower frequencies, to/than those of the noise or noises absorbed by the acoustic structure 2. The combination of the acoustic structure 2 and the auxiliary acoustic device 7 therefore enables combination of the properties and characteristics of the two types of acoustic absorption and thus increasing the range of frequencies of noise that can be attenuated by the acoustic panel 1. Moreover, the auxiliary acoustic device 7 enables the acoustic area of the acoustic panel 1 to be increased.

Moreover, in the context of the disclosure herein, the resistive skin 5 (and where appropriate the whole or a part of the acoustic panel 1) may be plane, as shown in FIGS. 1 to 7, or curved (single or double curvature, convex and/or concave).

In the context of the disclosure herein, the plate 3 can also be produced in different ways.

To be more precise, the material 4 of the plate 3 may be produced in one of the following ways:
    with a cellular structure, preferably a honeycomb structure, or a cellular structure including cells with other shapes; in this case the absorption is produced by the perforated resistive skin 5, the function of the cellular structure being to define an optimum absorption frequency. The energy of the acoustic waves is reduced by viscous losses at the level of the perforations of the resistive skin 5; or
    with a foam having appropriate acoustic properties; or
    with a fibrous material or a sintered material having appropriate acoustic properties.

In the latter two examples (foam, fibrous or sintered material) the material 4 may be an acoustic absorbent material that contributes to acoustic absorption by the acoustic structure 2.

The material of the plate 3 may be for example a carbon fiber reinforced polymer material reinforced with carbon fiber (CFRP material) with aramide fiber, with glass fiber or with a metal such as aluminum or titanium.

The acoustic panel 1 as described above has numerous advantages. In particular it makes it possible, with no increase of mass or overall size (and where applicable drag), or at most a small increase in mass and possibly overall size (and drag):
    to optimize acoustic absorption;
    to process or to absorb different ranges of acoustic frequencies;
    to combine elements having different acoustic absorption properties.

Moreover, for at least some of the embodiments that may be envisioned the auxiliary acoustic devices 7 that are attached to the acoustic structure 2:

may also be used to fix the acoustic panel 1 to a particular element, for example a front lip, for example via the plate 22 (FIGS. 1, 2, 4 and 6) and a flange of an air intake of a propulsion system of an aircraft; and may contribute to the structural strength of the acoustic panel 1 by withstanding some level of structural forces.

There are described hereinafter two (nonlimiting) methods of manufacturing an acoustic panel 1 such as that described above.

Figure 8:
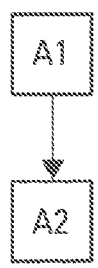
FIGS. 8 and 9 illustrate diagrammatically the respective main steps of two different methods of manufacturing an acoustic panel.

A preferred first method of manufacture includes a plurality of successive steps comprising at least the following steps, as shown in FIG. 8 (linked to the first embodiment from FIG. 1):

a step A1 consisting in or comprising forming a one-piece assembly comprising the acoustic structure 2 provided with the plate 3, the resistive skin 5 and the backing skin 6 and one or more auxiliary acoustic devices 7, notably with perforation of the overall resistive skin 5 (with its extension 11); and a step A2 consisting in or comprising curing the one-piece assembly formed in this way (and notably the overall resistive skin 5) to manufacture a one-piece part 10.

Figure 9:

A second method of manufacture includes a plurality of successive steps comprising at least the following steps, as shown in FIG. 9 (linked to the second embodiment from FIG. 4):

a step B1 consisting in or comprising manufacturing the acoustic structure 2 provided with the plate 3, the resistive skin 5 and the backing skin 6, notably including curing the skins in the case of a composite material;

a step B2 consisting in or comprising manufacturing one or more auxiliary acoustic devices 7, in particular including curing in the case of a composite material; and a step B3 consisting in or comprising fixing the auxiliary acoustic device or devices 7 onto the acoustic structure 2.

In a preferred application (not shown) the acoustic panel 1 is intended to enable reduction of the noise from a nacelle (not shown) of a propulsion system (or jet engine) of an aircraft. The acoustic panel 1 is arranged in the air intake of the propulsion system.

The location of the auxiliary acoustic device 7 may play a role in its operation. By way of illustration, downstream in the airflow (close to the blades of the fan of the propulsion system), it enables direct reduction of noise at source, which also makes it possible to attenuate the other frequencies (because it reduces the overall energy of the sound). On the upstream side, it enables increased attenuation of the chosen frequency. Attenuating noise upstream and/or downstream and/or at the circumference may therefore be envisioned.

In the usual way, the acoustic panel or panels 1 intended for an air intake are sized relative to:

a blade loss;

an aerodynamic load (overpressure) over all the internal perimeter of the acoustic panel;

a bird strike;

a thermal case.

The auxiliary acoustic device 7 of the acoustic panel 1 therefore enables reduction of noise at specific frequencies, for example such as the frequency of the blades which has a high acoustic emergence. The auxiliary acoustic device 7 enables targeting of high and very low frequencies, which is not the case of a honeycomb structure for example. It is therefore possible to have production of the noise of a large volume without having to produce microperforations in all of the base.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel for aircraft, the acoustic panel comprising an acoustic structure having a cellular structure and a resistive skin and a backing skin on respective opposite sides of the cellular structure, the acoustic panel comprising at least one auxiliary acoustic device with cavities configured to produce acoustic absorption, the auxiliary acoustic device with cavities being attached to the acoustic structure, the auxiliary acoustic device with cavities comprising a plurality of adjacent chambers separated by shared walls, each of the chambers having a volume that is greater than a volume of a cell of the cellular structure, and each of the chambers having perforations and configured to produce acoustic absorption, wherein the auxiliary acoustic device with cavities is on a peripheral edge of the acoustic structure where the acoustic panel comprises an edge part for fixing the acoustic panel and wherein the perforations are on a front face of the auxiliary acoustic device with cavities.

2. The acoustic panel of claim 1, wherein the acoustic structure and the auxiliary acoustic device with cavities form a one-piece part.

3. The acoustic panel of claim 2, wherein the auxiliary acoustic device with cavities has a first face that corresponds to an extension of the resistive skin, walls of at least some of the chambers forming part of the first face.

4. The acoustic panel of claim 2, wherein the auxiliary acoustic device with cavities has a second face that corresponds to an extension of the backing skin, the walls of at least some of the chambers forming part of the second face.

5. The acoustic panel of claim 1, wherein the auxiliary acoustic device is fixed to the acoustic structure.

6. The acoustic panel of claim 5, wherein the auxiliary acoustic device with cavities has a front face, the front face having at least a first part with perforations and a second part with no perforations, and wherein the resistive skin of the acoustic structure is fixed to the second part of the front face.

7. The acoustic panel of claim 5, wherein the auxiliary acoustic device with cavities has a rear face that is fixed to the backing skin of the acoustic structure in an aligned or non-aligned manner.

8. The acoustic panel of claim 1, wherein the at least one auxiliary acoustic device with cavities is at least on part of at least one peripheral edge of the acoustic structure.

9. The acoustic panel of claim 8, comprising at least two auxiliary acoustic devices on at least two peripheral edges of the acoustic structure or on at least two sections of a peripheral edge of the acoustic structure.

10. The acoustic panel of claim 1, wherein the auxiliary acoustic device has at least one perforated face with perforations and the perforated face is on a same side of the acoustic panel as the resistive skin.

11. The acoustic panel of claim 1, wherein the auxiliary acoustic device comprises chambers of identical volume.

12. The acoustic panel of claim 1, wherein the auxiliary acoustic device comprises chambers of different types.

13. The acoustic panel of claim 12, wherein, for each chamber of the auxiliary acoustic device, at least a volume of the chamber and an area of the perforations of the chamber are adapted to confer on the chamber preferential acoustic absorption in at least one given range of acoustic frequencies.

14. The acoustic panel of claim 1, wherein the perforations have surfaces of a shape included in a circle having a diameter between 0.1 and 1.2 millimeters inclusive.

15. A method of manufacturing an acoustic panel, comprising a plurality of steps including at least one curing step and comprising:
manufacturing an acoustic panel for aircraft, the acoustic panel comprising:
an acoustic structure having a cellular structure and a resistive skin and a backing skin on respective opposite sides of the cellular structure, the acoustic panel comprising at least one auxiliary acoustic device with cavities configured to produce acoustic absorption, the auxiliary acoustic device with cavities being attached to the acoustic structure, the auxiliary acoustic device with cavities comprising a plurality of adjacent chambers separated by shared walls, each of the chambers having a volume that is greater than a volume of a cell of the cellular structure, and each of the chambers having perforations and configured to produce acoustic absorption,
wherein the auxiliary acoustic device with cavities is on a peripheral edge of the acoustic structure where the acoustic panel comprises an edge part for fixing the acoustic panel and wherein the perforations are on a front face of the auxiliary acoustic device with cavities.

16. The method of claim 15, wherein the plurality of steps comprises at least:
forming a one-piece assembly comprising the acoustic structure having the cellular structure and the resistive and backing skins and one or more auxiliary acoustic devices; and
curing the one-piece assembly to manufacture a one-piece part.

17. The method of claim 15, wherein the plurality of steps comprises at least:
manufacturing the acoustic structure having the cellular structure and the resistive and backing skins;
manufacturing one or more auxiliary acoustic devices, including curing; and
fixing the auxiliary acoustic device or devices to the acoustic structure.

* * * * *